Feb. 11, 1958     A. Y. DODGE     2,822,905
ONE WAY CLUTCH
Filed June 1, 1954
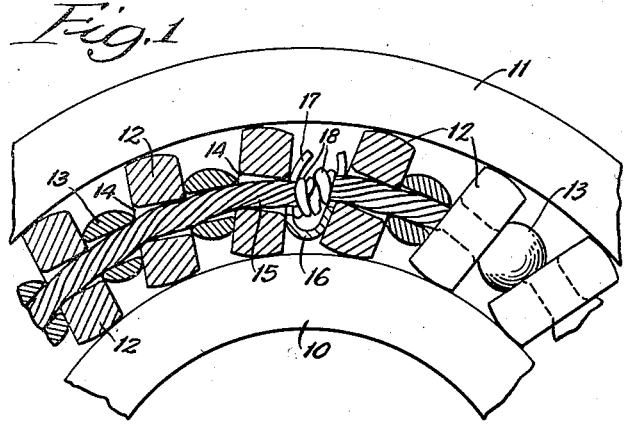
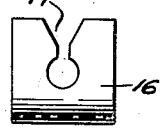
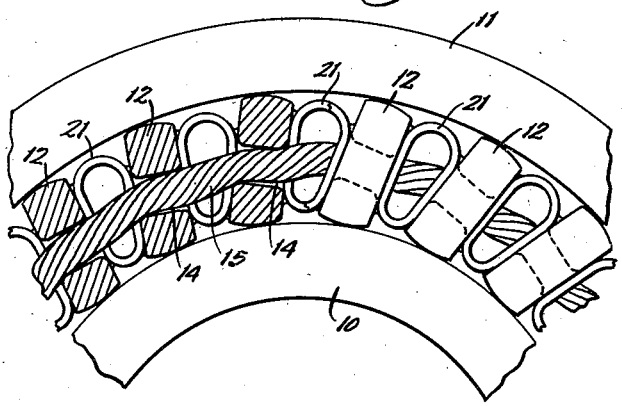
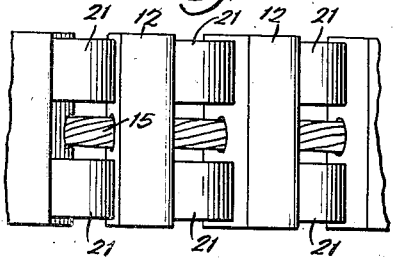
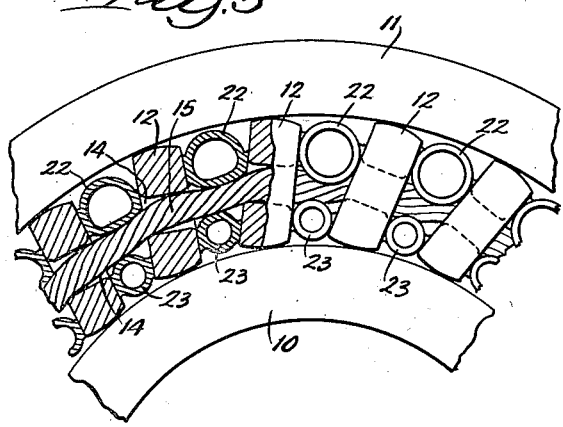
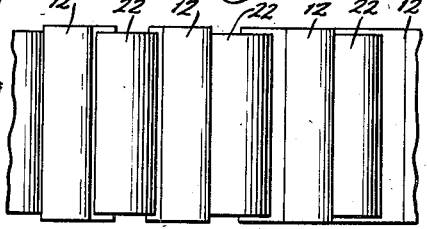
INVENTOR:
Adiel Y. Dodge,
BY
ATTORNEYS.

United States Patent Office 2,822,905
Patented Feb. 11, 1958

2,822,905
ONE WAY CLUTCH
Adiel Y. Dodge, Rockford, Ill.

Application June 1, 1954, Serial No. 433,530

7 Claims. (Cl. 192—45.1)

This invention relates to one way clutches and more particularly to one way clutches of the tilting gripper type.

In one way clutches of the tilting gripper type it is highly desirable, if not essential, that the grippers be held together in a unitary assembly so that they can be stocked and handled as a unit. It is also desirable that the grippers be urged to tilt into their engaging position so that they will engage rapidly and uniformly in response to torque impulses in the driving direction. Heretofore these functions have been accomplished by mounting the grippers in an annular cage structure and by employing springs acting on the grippers or the cage structure to urge the grippers to tilt toward engagement. Such constructions, while operating very satisfactory, are relatively expensive and furthermore require different size cages for each different clutch assembly.

It is one of the objects of the present invention to provide a one way clutch which can be assembled to be stocked and handled as a unit and in which the grippers are urged to tilt toward their engaging position without requiring a cage.

Another object is to provide a one way clutch in which the parts can be stocked and can be assembled to provide any desired size of clutch without requiring special parts for different sizes.

Still another object is to provide a one way clutch in which the grippers are separated by resilient separators and are held assembled by a flexible tension element, such as a cord threaded through an aligned opening therein.

In one desirable construction, the separators are in the form of annular resilient rings through which the tension element is threaded and in another construction the separators are in the form of resilient tubular elements lying between and secured to the grippers.

According to one feature of the invention, the resilient separators are compressed between the grippers so that they tend to urge the grippers to tilt toward their engaging position. The cord may also be bent laterally as the grippers tilt to disengaging position so that it also tends to tilt them into engagement.

The above and other objects and features of the invention will be more readily apparent from the following description when read in connection with the accompanying drawing in which:

Figure 1 is an end elevation with parts in section of a one way clutch embodying the invention;

Figure 2 is a side elevation of a connector element of Figure 1;

Figure 3 is a view similar to Figure 1 of an alternative construction;

Figure 4 is a partial elevation of the gripper and separator assembly of Figure 3;

Figure 5 is a view similar to Figure 1 of another alternative construction; and

Figure 6 is a partial elevation of the gripper assembly of Figure 5.

The clutch, as shown in Figure 1, is adapted to connect inner and outer concentric cylindrical races 10 and 11 for rotation together in one direction, but for free relative rotation in the opposite direction. The clutch comprises an annular series of tiltable grippers 12 arranged between the races. Each gripper is formed with end surfaces curved about spaced centers so that when the grippers are tilted counter-clockwise, as seen in Figure 1, they will wedge between and connect the races while when they are tilted clockwise, they will disengage the races for free relative rotation.

The grippers are held separated and are resiliently urged toward their engaging position by a plurality of resilient separators 13. The separators 13, as shown in Figure 1, are in the form of annular resilient bodies formed of rubber, or a synthetic rubber, or resilient plastic, which will resist oil. The separators are mounted between adjacent grippers, as shown, to hold the grippers spaced apart from each other and are of sufficient width to engage the grippers on opposite sides of the radial centers thereof. The spacers are preferably slightly compressed when the grippers tilt clockwise toward their disengaging position so that they exert a resilient force on the grippers urging them to tilt counter-clockwise into engagement with the races.

The grippers and separators are held assembled, according to the present invention, by providing the grippers with bores 14 extending transversely therethrough from face to face thereof. A flexible tension element, shown as a cord 15, is threaded through the openings in the grippers and the separators to hold them properly assembled with each other. The cord 15 may be formed of any desired material, such as a twisted or braided wire or non-metallic fiber. One material very satisfactory for the purposes of the present invention is a braided or twisted nylon cord of a size to fit relatively closely in the opening.

The cord is secured into an annulus of the proper size to fit between the races by providing its ends with enlargements as, for example, by knotting and utilizing a fastener, as shown in Figures 1 and 2, to receive the enlargements. The fastener may comprise a U-shaped strip of metal 16 whose opposite sides are formed with notches 17. The body of the cord back of the enlarged ends may be slipped through the notches so that the enlarged ends 18 of the cord lie within the fastener 16. The ends are of a size such that they will not slip through the notches 17. In this way the cord can be knotted to the correct length in any suitable jig, or the like, after the grippers and separators have been assembled thereon and its ends can be secured together simply by slipping them into the notches in the connector 16. The connector is preferably slightly resilient so that it may be compressed by tilting of the grippers and may spread slightly, if required in response to tension on the cord. In this connection, the use of a nylon cord is highly desirable since it is slightly elastic and can stretch if necessary to accommodate movement of the grippers.

With this construction, the grippers, separators and cord may be stocked and may be assembled into a unit of any required size to fit any particular set of races. When the size is determined, the necessary number of grippers and separators may be threaded onto the cord and the ends of the cord may then be knotted. Upon applying the connector 16 the assembly is completed ready for mounting between races.

With the clutch completely assembled, when the inner race 10 turns counter-clockwise relative to the outer race, the grippers will be tilted clockwise to disengage the races and permit relative rotation therebetween. Tilting of the grippers in the clockwise direction will compress the separators 13 and may additionally bend the cord 15 laterally to a slight extent, as illustrated. The force exerted by the separators and the cord tends to urge the grippers to their engaging position and may be regulated to control the pressure of the grippers against the races during overrunning.

When the inner race 10 tends to turn clockwise relative to the outer race, the grippers will be wedged between the races to connect them. This wedging action resulting from counter-clockwise tilting of the grippers results from the resilient force exerted on the grippers by the separators and the cord and by the friction of the races against the gripper end surfaces. Thus the grippers will tilt very rapidly to their engaged position to connect the races for rotation with a minimum of free motion or backlash.

Figures 3 and 4 illustrate an alternative construction which is identical to that of Figures 1 and 2, except for the form of the separators and parts in these figures identical with corresponding parts in Figures 1 and 2 are indicated by the same reference numerals. In this construction, the grippers are separated by resilient tubular bodies 21 which may be in the form of sections of tubing made from a resilient material such as rubber, synthetic rubber, or plastic mounted between adjacent grippers and extending across the radial centers thereof. As shown in Figure 4, the separators are in the form of two short sections of tubing mounted adjacent the ends of the grippers and spaced apart in the center portions of the grippers to provide space for free passage of the cord. Preferably the separator elements 21 are secured to the gripper faces as by cementing or the like.

Operation of this embodiment is identical with that of Figures 1 and 2 and the same advantages are present. To make clutches of different sizes with the construction of Figures 3 and 4, the requisite number of separators may be cemented to the grippers after which the cord may be threaded through the grippers. It will be appreciated, of course, that the separators and grippers could be pre-assembled and cemented in indefinite lengths and one of the separators could be cut off or otherwise removed to form a clutch assembly of the desired diameter.

Figures 5 and 6 illustrate a further alternative construction in which all of the parts, except the separators are identical with corresponding parts in Figures 1 to 4 and are indicated by the same reference numerals. In this construction, the separators are in the form of elongated resilient tubes 22 secured between the grippers adjacent the outer edges thereof and smaller tubes 23 spaced from the tubes 22 and secured between the grippers adjacent their inner edges the tubes 22 and 23 being on opposite sides of the radial centers of the grippers. The cord 15 may pass between the tubes 22 and 23 in the assembly, as shown. Preferably the tubes 22 and 23 are secured to the grippers by cementing or the like in the same manner as the grippers of Figures 3 and 4.

While several embodiments of the invention have been shown and described herein, it will be understood that they are illustrative only and not to be taken as a definition of the scope of the invention, reference being had for this purpose to the appended claims.

What is claimed is:

1. A one way clutch comprising a series of tiltable grippers adapted to be mounted between concentric races to engage the races when they are tilted in one direction and to release the races when they are tilted in the opposite direction, circumferentially resilient separators lying between and simultaneously engaging grippers on opposite sides of the radial center thereof spacing adjacent grippers, means securing the separators to the grippers, the grippers having openings therethrough, and a laterally flexible annular tension element threaded through the openings.

2. A one way clutch comprising a series of tiltable grippers adapted to be mounted between concentric races to engage the races when they are tilted in one direction and to release the races when they are tilted in the opposite direction, resilient separators lying between and spacing adjacent grippers, the grippers having openings therethrough, and a flexible tension element extending through the openings, the ends of the tension element lying adjacent to each other and being formed with enlargements, and a clip having slots in its sides to receive the ends of the tension element and engage the enlargements thereby to secure the ends of the tension element together.

3. A on way clutch for use with coaxial cylindrical races comprising an annular series of tiltable grippers adapted to be mounted between the races to engage the races when they are tilted in one direction and to release the races when they are tilted in the other direction, circumferentially resilient separators between and engaging the adjacent faces of the grippers on opposite sides of the radial centers thereof and urging them to tilt in said one direction, the grippers having aligned openings therethrough, a flexible tension element threaded through the openings, enlarged ends on the tension element, and a U-shaped grip having slots in its sides to receive the tension element and engage the enlarged ends.

4. A one way clutch for use with coaxial cylindrical races comprising an annular series of tiltable grippers adapted to be mounted between the races to engage the races when they are tilted in one direction and to release the races when they are tilted in the other direction, circumferentially resilient separators between and secured to the grippers on opposite sides of the radial centers thereof and urging them to tilt in said one direction, the grippers having aligned openings therethrough, a flexible tension element threaded through the openings and means securing the ends of the tension element together.

5. A one way clutch for use with coaxial cylindrical races comprising an annular series of tiltable grippers adapted to be mounted between the races to engage the races when they are tilted in one direction and to release the races when they are tilted in the other direction, circumferentially resilient tubular separators arranged with their axes parellel to the length of the grippers between and secured to the grippers and urging them to tilt in said one direction, the grippers on opposite sides of the radial centers thereof having aligned openings therethrough, a flexible tension element threaded through the openings, and means securing the ends of the tension element together.

6. A one way clutch comprising a series of tiltable grippers adapted to be mounted between concentric races to engage the races when they are tilted in one direction and to release the races when they are tilted in the opposite direction, circumferentially resilient spacer elements lying between and spacing adjacent grippers, each of the spacer elements having sufficient circumferential length above and below the radial center of the grippers to extend between and engage each of the adjacent grippers on opposite sides of the radial center thereof and being compressed circumferentially by the grippers at all times, the grippers having substantially central openings therethrough, and a laterally flexible annular tension element extending through the openings and substantially centrally through the spacer elements and securing the grippers and spacers together in an annular assembly.

7. The clutch of claim 6 in which the spacers are annular and the tension element is threaded through the openings therein.

References Cited in the file of this patent

UNITED STATES PATENTS

| | | |
|---|---|---|
| 2,364,280 | Dodge | Dec. 5, 1944 |
| 2,555,484 | Gruenberg | June 5, 1951 |
| 2,614,670 | Heintz | Oct. 21, 1952 |
| 2,748,912 | Banker | June 5, 1956 |